H. THOMASON.
WHEEL AND GEAR PULLER.
APPLICATION FILED JAN. 10, 1917.
1,359,768. Patented Nov. 23, 1920.
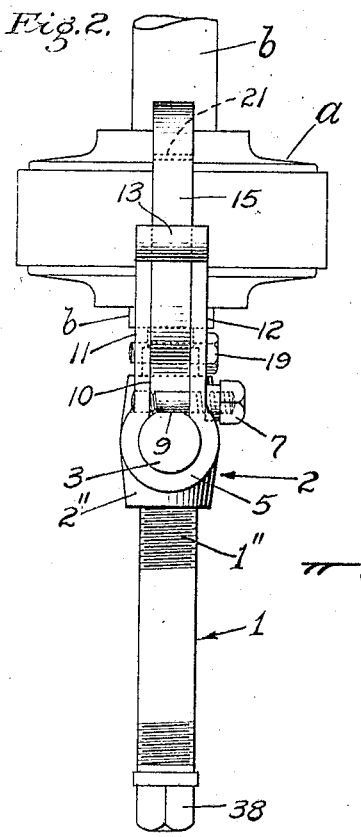
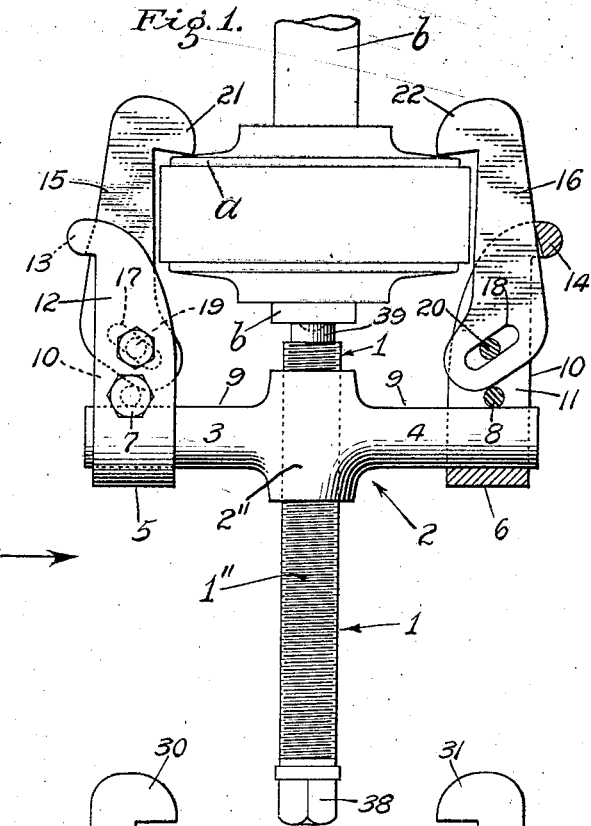
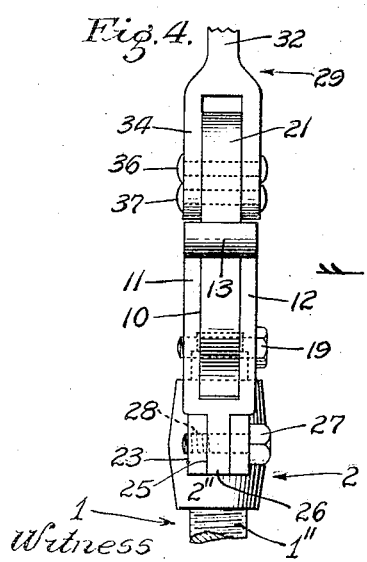
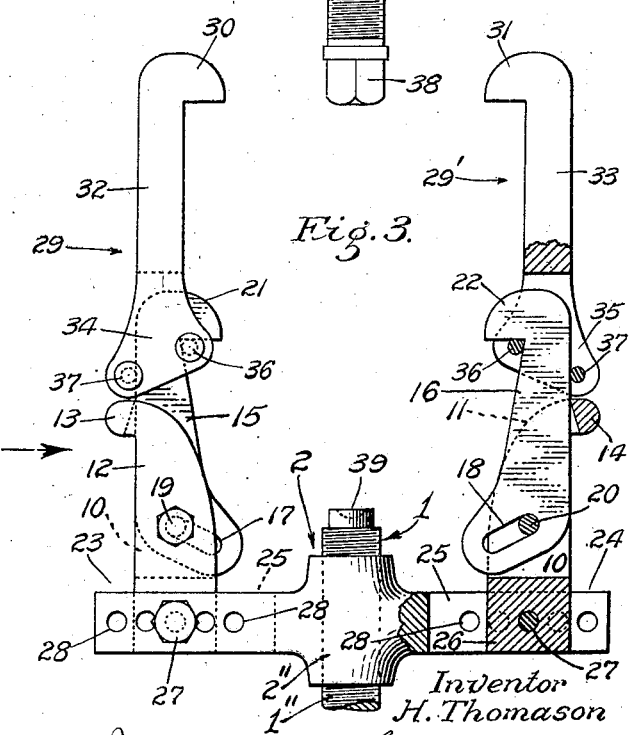
Inventor
H. Thomason

UNITED STATES PATENT OFFICE.

HJALMAR THOMASON, OF LOS ANGELES, CALIFORNIA.

WHEEL AND GEAR PULLER.

1,359,768.  Specification of Letters Patent.  Patented Nov. 23, 1920.

Application filed January 10, 1917. Serial No. 141,690.

*To all whom it may concern:*

Be it known that I, HJALMAR THOMASON, a subject of the King of Sweden, residing at Los Angeles, in the county of Los Angeles and State of California, have invented a new and useful Improvement in Wheel and Gear Pullers, of which the following is a specification.

My invention relates to that type of tools used for pulling hubs or the like from shafts.

An object of the invention is to make a wheel and gear puller provided with means whereby the pulling strain will tighten the grip.

Another object is to provide extension jaws.

Other objects are cheapness, simplicity, strength, compactness, and ease and convenience of use.

Other objects, advantages and features of novelty may appear from the accompanying drawings, the subjoined detail description and the appended claims.

The accompanying drawings illustrate the invention.

Figure 1 is a plan view of a gear and wheel puller embodying the principles of my invention, applied to pull a hub from a shaft.

Fig. 2 is a side elevation as indicated by the feathered arrow 2 in Fig. 1.

Fig. 3 is a modification of Fig. 1 showing extension jaws.

Fig. 4 is an edge view of Fig. 3.

Parts in Figs. 1 and 3 are sectional and Fig. 4 is broken to contract the view.

The feed screw 1 constituting shaft engaging means, is mounted to travel a considerable distance back and forth through the crosshead or main body member 2. Arms 3 and 4 extend from opposite sides of the crosshead 2 and together therewith form the main body. Bearing blocks 5 and 6 are slidably mounted upon the arms 3 and 4 and are held rigidly in place by the clamping screws 7 and 8. The arms 3 and 4 are preferably round with flattened sides 9 and the screws 7 and 8 fit against these flat sides to prevent rotation of the bearing blocks upon the arms and hold the bearing blocks parallel with the feed screw 1. Slots 10 extend from the arms through the bearing blocks past the clamping screws, thus making the bearings yielding to grip under the tension of the screws. Hinge members 11 and 12 extend outwardly from the bearing blocks on each side of the slots 10, and the outer ends of said hinge members are connected by stop bars 13 and 14. The gripping jaws in the form of toothed rockers 15 and 16 fit between the hinge members 11 and 12 and have inclined slots 17 and 18 through which hinge-pins 19 and 20 are inserted to hold the jaws in place within the limits of the slots. The jaws have inwardly projecting hooks or teeth 21 and 22 to engage behind the hub $a$ and the feed screw engages against the end of the shaft $b$. When strain is applied the jaws are drawn against the stop bars, the inclined slots 17 and 18 riding on the hinge pins 19 and 20 and the cross bars 13, 14 tilt the hooks toward each other and the harder the pull the tighter the grip.

The bearing blocks are to be moved to and from each other and tightly clamped to adjust the rockers to fit hubs of different sizes.

In Figs. 3 and 4 I show a modified construction. The arms 23 and 24 extending outwardly from the crosshead 2 are slotted at 25 and the hinge members have heads 26 adjustably mounted in these slots by the pins 27 fitting the pin holes 28 as required to locate the jaws to fit the hub.

The extension jaws 29 and 29' each comprise the extension hooks or gripping ends 30 and 31, the arms 32 and 33 and the heads 34 and 35. The heads 34 and 35 are bifurcated to receive the main hooks 21 and 22, there being pins 36 to engage in front of the main hooks and pins 37 to engage behind the main hooks; said pins being arranged diagonally, so that when the extension jaws 29 and 29' are applied, outward pressure will make the extension jaws rigid with the main jaws.

In each of the forms shown the guide means are constituted of stop bars 13, 14, the pins 19, 20, and the slots 17, 18, which slots are inclined with relation to the feed screw 1 or the direction of pull; and said guide means connecting the toothed rockers to the main body-member are arranged to rock the hooks or toothed portions of the rockers toward each other as the rockers are relatively moved away from the main body-member, which occurs whenever the shaft-engaging means 1 is moved forcibly against the shaft $b$ while the toothed rockers are engaged upon the hub $a$.

The thread 1'' on the member 1, the internally threaded part or nut 2'' intermediate between the arms 3 and 4 of the body member 2 and the wrench seat 38 on member 1 constitute means to move the shaft-engaging means 39 relative to the main body 2.

Said shaft-engaging means is formed as a hollowed tip for the feed screw 1 to engage the shaft somewhat anti-frictionally.

It is understood that the various features of construction may be altered and the form of the rockers and guides may be altered within the judgment of the constructor without departing from the spirit of the invention and I do not limit my invention to the specific forms shown, except as required by the scope of the appended claims.

It is thus seen that in carrying out the invention in one of its forms I employ pin and slot connections in inclined relation to jaws and a body member and stop means, so as to control the movement of the jaws when the same are engaged with a hub to be pulled from a shaft, and said shaft is engaged to forcibly move the hub and such jaws relative to each other. Said slot connection may be variously constructed, but illustration of one form is deemed sufficient to enable those skilled in the art to construct the same.

I claim:

1. A feed screw, a crosshead for the feed screw, arms extending from the crosshead, hinge members adjustably mounted upon the arms, stop bars upon the hinge members, jaws slidingly mounted in the hinge members and adapted to engage the stop bars, there being inclined slots in the jaws and hinge pins passing through such slots, so that as the jaws are pulled outwardly the gripping ends thereof are pressed inwardly to tighten the grip.

2. In a puller, hinge members, a stop bar connecting the hinge members, a jaw slidingly mounted between the hinge members and engaging the stop and having an inclined slot, and a hinge pin through the hinge members and extending through the slot.

3. In combination with a pair of main jaws, each provided with a tooth, an extension jaw adapted to be attached to each respective main jaw and provided with two pins to engage the main jaw in front and behind the main tooth respectively, said pins being arranged diagonally so that when the extensions are applied, outward pressure will make each extension rigid with its respective main jaw.

4. A feed screw, a crosshead for the feed screw, arms extending from the crosshead, hinge members adjustably mounted upon the arms, stop bars upon the hinge members, main jaws slidingly mounted in the hinge members and adapted to engage the stop bars, there being inclined slots through which hinge pins pass, so that as the jaws are pulled outwardly the points are pressed inwardly to tighten the grip, and extension jaws adapted to join onto the outer ends of the main jaws, so that the extended jaws will be rigid with the main jaws.

5. A wheel or gear puller comprising a main body member, toothed rockers to engage the wheel or gear hub, shaft engaging means connected to the main body member and forcibly movable relative thereto, and guide-means connecting the toothed rockers to the main body member and arranged to rock the toothed portions of the rockers toward each other as the rockers are moved away from the main body member.

6. The combination with a main body member provided with lateral arms and an intermediate threaded part, of a bearing block slidable longitudinally upon each arm; means for clamping the bearing blocks to the respective arms; hinge members extending from the bearing blocks; toothed members mounted in movable relation to the hinge members, said toothed members being supported by the hinge members and thereby prevented from spreading apart; and a screw threaded into the internally threaded part of the main body member for engaging one end of a shaft while said toothed members engage a hub, or the like, which is to be removed from said shaft.

7. In a wheel or gear puller a main body member, gripping jaws, pin and slot connections in inclined slidable relation to said jaws and main body member, stop means adapted to engage the jaws in order to control the gripping movement of the jaws, and means forcibly movable relative to the main body member to engage a shaft and move the same relative to a hub, or the like, driven on the shaft and engaged by the jaws.

In testimony whereof, I have hereunto set my hand at Los Angeles, California, this 2nd day of January, 1917.

HJALMAR THOMASON.